Figure 1:
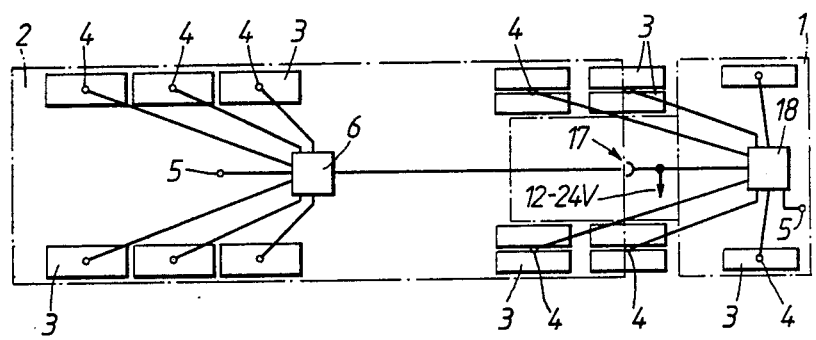

United States Patent [19]
Don

[11] Patent Number: 4,760,371
[45] Date of Patent: Jul. 26, 1988

[54] VEHICLE TYRE MONITORING SYSTEM

[75] Inventor: Gerald W. Don, Porthcawl, Wales

[73] Assignee: Glamorgan Electronics Limited, Mid-Glamorgan, Wales

[21] Appl. No.: 113,419

[22] Filed: Oct. 27, 1987

Related U.S. Application Data

[63] Continuation of Ser. No. 816,613, Jan. 6, 1986, abandoned.

[30] Foreign Application Priority Data

Jan. 5, 1985 [GB] United Kingdom ............... 8500281

[51] Int. Cl.⁴ .................... B60Q 1/00; B60C 23/02
[52] U.S. Cl. .............................. 340/57; 340/58; 73/146.5; 116/34 R; 116/34 A; 374/121
[58] Field of Search ............... 340/57, 58, 539, 52 R; 73/146, 146.2, 146.5; 116/34 R, 34 A, 34 B; 374/121

[56] References Cited

U.S. PATENT DOCUMENTS

| | | | |
|---|---|---|---|
| 3,491,335 | 1/1970 | MacConochie | 340/57 |
| 3,510,835 | 5/1970 | Gilbert | 340/57 |
| 3,852,717 | 12/1974 | Hosaka et al. | 340/58 |
| 3,875,558 | 4/1975 | Samples | 340/57 |
| 3,938,077 | 2/1976 | Nakanishi et al. | 340/58 |
| 4,024,495 | 5/1977 | O'Brien | 340/57 |
| 4,065,751 | 12/1977 | Stewart et al. | 340/58 |
| 4,355,298 | 10/1982 | Jessup | 340/58 |

FOREIGN PATENT DOCUMENTS

| | | | |
|---|---|---|---|
| 0023354 | 2/1981 | European Pat. Off. | |
| 0045401 | 7/1981 | European Pat. Off. | |
| 2206517 | 8/1973 | Fed. Rep. of Germany | 340/58 |
| 2052121 | 1/1981 | United Kingdom | |

*Primary Examiner*—Donnie L. Crosland
*Attorney, Agent, or Firm*—Young & Thompson

[57] ABSTRACT

A tyre running hot due to under-inflation or other causes radiates heat. This is detected by sensors (4,27) positioned within the wheel arches. A comparison is made between each sensor output and a norm, such as ambient temperature from air temperature detectors (5) or the mean of all the sensor outputs, and significant departure from that norm triggers an alarm (22). The sensors may each be a detector (27) at the focus of a parabolic reflecting shell (28) shielded by a heat-transparent cover (30), and they will generally be positioned to face the inner side walls of the tyres. Direct wiring to the alarm unit is possible, but with a trailer (2) the signals may be locally encoded, fed by existing wiring (13) to the tractor (1) and there be decoded.

8 Claims, 2 Drawing Sheets

VEHICLE TYRE MONITORING SYSTEM

This application is a continuation of application Ser. No. 816,613, filed Jan. 6, 1986, now abandoned.

This invention relates to a vehicle tyre monitoring system.

It is very important for safety and economy, and also for keeping within the law, to maintain pneumatic tyres at the correct pressure. Checking pressures when the vehicle is stationary is of course quite simple, although rather tedious, but even if this is done regularly, it cannot guard against loss of pressure on a long motorway journey, for example.

There has long been a desire to have a continuous tyre pressure monitoring system, but of course the problem is that the tyres are on rotating wheels. The approach therefore has been to fit some transmitting mechanism on each wheel/tyre assembly which will convey tyre pressure information to the body of the vehicle. This is an expensive solution, and none has been found to be sufficiently practical to gain universal acceptance. It is a very hostile environment around the wheel of a vehicle, and the transmitting technique is very prone to interference, or it can be adversely affected by dirt which accumulates in that region.

It is the aim of this invention to provide a system which does not require anything to be fitted to the wheel or tyre and yet which can give quite a reliable indication of incorrect tyre pressures.

According to the present invention there is provided a vehicle tyre monitoring system wherein heat radiated from a tyre is sensed and departure by a significant extent from an expected norm is arranged to generate an alarm.

The temperature in the region of the tyre may be compared with ambient and/or other tyre temperatures. If a tyre has lost pressure, then it tends to run hot as it is subject to more than the usual flexing. This is sufficient to be detected by a nearby sensor. Thus, if there is an unusual rise in temperature, a warning is given that the tyre is running hot and is possibly under-inflated, overloaded, or overheated from some other cause.

Generally, the system will be applied to all the tyres of a vehicle, in which case the temperature of each tyre may be compared with the mean temperature of all the tyres. It is reasonable to assume that, particularly in a commercial vehicle with perhaps twelve tyres, they will not all puncture simultaneously, and that therefore the mean temperature will stay substantially constant, even though one tyre may deflate and run hot. Even with a four wheel vehicle, it is probable that three tyres will remain sound if the fourth is faulty, and the mean sensed temperature will not rise much in comparison with that of the faulty tyre.

The sensors will preferably be heat sensing probes mounted within the wheel arches in such a manner that even at full deflection of the vehicle suspension system they will not actually come in contact with the wheels. Conveniently they will face the inner side walls of the tyres. It has been found that their exact position is not critical and that, although they are in a hostile environment, and may be coated with mud, their performance does not noticeably deteriorate. The radiated heat is expected to border the infra-red part of the spectrum and the sensors will be tuned accordingly.

For a non-articulated vehicle, the outputs of the sensors can be fed directly to an alarm unit in the cab. With a trailer, however, although the sensor outputs could be similarly fed to the cab by coupling a multiplicity of wires, it will be preferred to have a local unit on the trailer which will receive the sensor outputs, encode them, and transmit the information along a single cable, using conveniently existing wiring, to the tractor. There this informatiin will be decoded and an alarm generated if appropriate.

The system can be extended also to give warning of ice.

Figure 2:
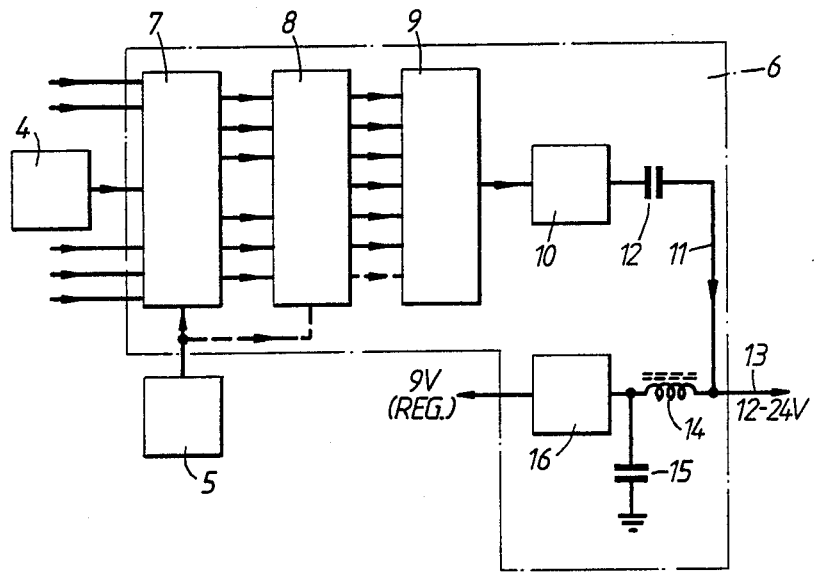
Figure 3:
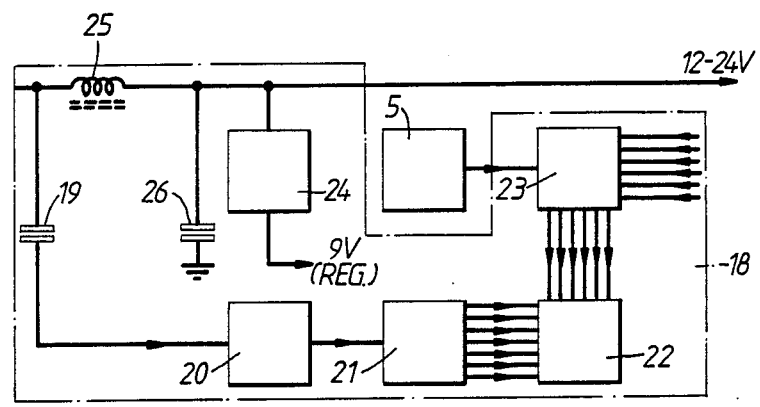
Figure 4:
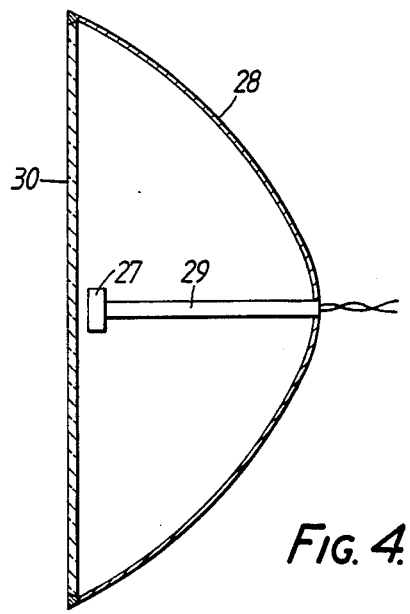

For a better understanding of the invention one embodiment will now be described, by way of example, with reference to the accompanying drawings, in which:

FIG. 1 is a diagram of the wheel layout of an articulated lorry, also showing an outline of a tyre monitoring system, FIG. 2 is a block diagram of a unit of the system for mounting on the trailer, FIG. 3 is a block diagram of part of the system mounted on the tractor, and FIG. 4 is a diagrammatic cross section of a heat sensor unit.

The lorry comprises a tractor 1 and a trailer 2, the wheel/tyre assemblies being indicated by the solid line rectangles 3. Associated with each assembly, and fixedly mounted within the wheel arch so as not to be struck by the wheel or tyre whatever the state of the suspension, there is a radiated heat sensing detector 4. Both tractor 1 and trailer 2 also have ambient air temperature detectors 5 in shielded positions remote from the wheels.

The outputs of the detectors 4 and 5 on the trailer are fed to a unit 6 which is shown in more detail in FIG. 2. Here, each tyre temperature is compared with ambient temperature in comparators 7. The results are shaped by Schmitt triggers 8 and then fed to an encoder 9. The ambient temperature from the trailer detector 5 may also be shaped and encoded, as indicated by the broken line connections, to provide an ice warning alarm. However, it may be sufficient to rely on the tractor detector 5 for this. The encoded signals are then applied to an RF transmitter 10 and thence to a transmission line 11 with a coupling capacitor 12. This line 11 is connected to the existing vehicle wiring 13 between tractor and trailer carrying the battery DC voltage. The unit 6 is energised from this, the RF signal being eliminated by a choke 14 and de-coupling capacitor 15, and the voltage being reduced to a suitable level by regulator 16.

The wiring 13 has a plug and socket connection 17 (FIG. 1) between tractor and trailer and continues to a unit 18, shown in slightly more detail in FIG. 3, which also receives the output of the temperature detectors 4 and 5 on the tractor.

The RF signals on wiring 13 pass through a coupling capacitor 19 to an RF receiver 20, and thence to a pulse decoder 21. The decoder 21 passes the separated comparative signals on to an alarm and display unit 22 and any significant deviations of temperature in the region of any one of the trailer tyres generates an alarm (audible and/or visual). The unit also identifies which tyre is at fault or indicates whether it is an ice warning, distinguishing between the two hazards. Likewise the information from the tractor detectors 4 are compared with ambient temperature from local detector 5 and shaped in a circuit 23 corresponding to circuits 7 and 8 of FIG.

2. These outputs are then fed directly to the alarm and display unit 22. The ice warning connection is not shown here.

The unit 8 is energised through voltage regulator 24, the RF signals in the supply of this being eliminated by choke 25 and decoupling capacitor 26.

If a comparison is made between the output of each sensor 4 and a mean of all such outputs (instead of the ambient temperature) then the circuits 7 and 8, and 23, will be adapted to determine the mean of the signals from the associated sensors and use this instead of the signal from the sensor 5.

It will be understood that the encoding-decoding system may be eliminated if there is dedicated wiring between the sensors and the alarm unit.

A heat sensor unit is shown in FIG. 4. The actual detector 27 is held at the focus of a parabolic reflector shell 28 by a stem 29 through which the signal wires lead. The detector and the reflecting surface of the shell are shielded by a window 30 substantially transparent to the radiated heat. The unit is positioned within the wheel arch preferably so that it faces a side wall of the tyre, and generally it will be the inner side wall as the shell 28 can be recessed into the body of the vehicle. There will then be no risk of physical interference by the wheel/tyre assembly. The unit should be set so that when the vehicle is averagely loaded it will be faced wholly by the tyre side-wall and so that, even at extreme wheel positions, it will still predominantly, at least, face a sidewall rather than space or the wheel on which the tyre is mounted.

What is claimed is:

1. A vehicle tyre monitoring system for a vehicle having wheels on opposite sides thereof, comprising a sensor fixedly mounted on the vehicle body adjacent the tyre, within a wheel arch for the tyre and continuously directly facing and spaced from a portion of a side wall of the tyre that turns relative to the fixed sensor, and adapted to sense heat radiated from the tyre at a point remote from said tyre, means for determining an expected temperature norm, substantially below critical tyre temperature, in the vicinity of the tyre, means for simultaneously comparing the sensed heat and the norm, and means for generating an alarm when the comparison indicates a significant deviation, wherein the sensor is on the inboard side of the wheel arch, facing the inner side wall of the tyre.

2. A system as claimed in claim 1, wherein the determining means includes an ambient temperature measuring device, the ambient temperature constituting said norm.

3. A system as claimed in claim 1, wherein the system has heat sensors for a plurality of tyres and the determining means is adapted to resolve a mean of the outputs of the sensors, this mean constituting said norm.

4. A system as claimed in claim 1 applied to a plurality of tyres wherein at least some of the tyres are those of a trailer and the alarm is on the towing vehicle, and wherein the trailer tyre heat readings are encoded by means on the trailer, transmitted to the towing vehicle by a common line, and decoded and separated by means on the towing vehicle.

5. A system as claimed in claim 4, wherein the common line carries a DC supply from the towing vehicle to the trailer.

6. A system as claimed in claim 1, said sensor comprising a detector at the focus of a reflective parabolic shell.

7. A system as claimed in claim 6, wherein a window substantially transparent to radiated heat protects the detector and reflective inner surface of the shell.

8. A vehicle tyre monitoring system comprising a sensor fixedly mounted on the vehicle body adjacent the tyre and responsive to heat radiated from the tyre, means for determining an expected temperature norm in the vicinity of the tyre, means for comparing the sensed heat and the norm, means for generating an alarm when the comparison indicates a significant deviation, means for determining ambient temperature and means triggering said alarm responsive to a fall of ambient temperature below a predetermined level, in a manner distinct from said alarm-generating means.

* * * * *